(12) United States Patent
Chang

(10) Patent No.: US 6,923,417 B2
(45) Date of Patent: Aug. 2, 2005

(54) PROJECTOR DEVICE

(75) Inventor: Lien-Wen Chang, Taipei (TW)

(73) Assignee: BenQ Corporation, Taoyuan (TW)

( * ) Notice: Subject to any disclaimer, the term of this patent is extended or adjusted under 35 U.S.C. 154(b) by 30 days.

(21) Appl. No.: 10/452,292

(22) Filed: Jun. 3, 2003

(65) Prior Publication Data

US 2003/0227600 A1 Dec. 11, 2003

(30) Foreign Application Priority Data

Jun. 11, 2002 (TW) ........................................ 91112655 A

(51) Int. Cl.$^7$ ................................................. F16M 1/00
(52) U.S. Cl. .................... 248/649; 248/188.5; 248/677; 353/119
(58) Field of Search ................................ 248/649, 655, 248/677, 188.2, 188.3, 188.5, 408, 409, 423; 353/70, 119; 182/204, 201

(56) References Cited

U.S. PATENT DOCUMENTS

| | | | | |
|---|---|---|---|---|
| 1,280,741 A | * | 10/1918 | Hunn | 182/204 |
| 3,527,321 A | * | 9/1970 | Brown | 182/205 |
| 5,678,656 A | * | 10/1997 | Lanzafame | 182/205 |
| 6,302,543 B1 | * | 10/2001 | Arai et al. | 353/70 |
| 6,719,431 B2 | * | 4/2004 | Liu et al. | 353/70 |
| 2003/0227601 A1 | * | 12/2003 | Chang | 353/119 |

FOREIGN PATENT DOCUMENTS

JP 09054370 A * 2/1997 ............ G03B/21/00

* cited by examiner

*Primary Examiner*—Korie Chan
(74) *Attorney, Agent, or Firm*—Michael Bednarek; Shaw Pittman LLP

(57) ABSTRACT

The present invention provides an electronic apparatus with a height adjusting apparatus. The electronic apparatus includes an adjusting apparatus and a housing. The adjusting apparatus has a connecting part, a leg, a push button, an elastic part, and a stopper. The connecting part connects with the housing and includes a groove and a rack. The leg is disposed movably within the groove to selectively support the electronic apparatus. The elastic part connects to the leg. The stopper engages with the rack to fix the length of the leg. The push button connects to the elastic part to adjust the length of the leg.

2 Claims, 7 Drawing Sheets

PROJECTOR DEVICE

This application claims priority of Taiwan Patent Application No.091112655 filed on Jun. 11, 2002.

FIELD OF INVENTION

The present invention relates to an apparatus for adjusting a height of an electronic apparatus.

BACKGROUND OF THE INVENTION

Traditionally, images projected by projectors are often twisted or rotated because the platforms for arranging the projectors are uneven. Therefore, to prevent the twist or rotation of images, projectors often have adjustable support leg.

FIG. 5 shows a traditional screw-typed support leg for use with projectors. The support leg 508 includes a support portion 510 and a screw portion 504. A contact between the support portion 502 and a platform 502 generates a friction force. When adjusting the support leg 508, users have to exert a larger force to overcome the friction force to rotate the screw portion 504. In addition, when raising up or dropping down the projectors with a long interval, users have to rotate the screw portion 504 for many circles.

FIG. 6 shows another adjustable support leg, which is disclosed in Japanese Patent Publication No. 11-271879. This support leg includes a bar 610, a rack 612, and springs 614a and 614b. The bar 610 is movably disposed on a housing 602. The bar 610 includes an extension portion 610a for controlling the bar 610 and a latch 610b for engaging with the rack 612. The spring 614a connects the housing 602 with the bar 610 and forces the latch 610b to engage with the rack 612. When adjusting the support leg, users may push the extension portion 610a to move the latch 610b and release the rack 612.

SUMMARY OF THE INVENTION

It is an aspect of the present invention to provide an adjusting apparatus for adjusting the height of an electronic apparatus. This adjusting apparatus includes a push button being exposed to an outside of the electronic apparatus.

The adjusting apparatus connects with a housing of the electronic apparatus. The adjusting apparatus includes a connecting part, a leg, a push button, an elastic part, and a stopper. The connecting part connects with the housing and includes a groove and a rack. The leg is movably disposed within the groove for selectively supporting the electronic apparatus. The elastic part connects with the leg. The stopper selectively engages with the rack to constrain the leg. The push button connects with the elastic part.

An external force is exerted on the push button 209 to force the elastic part to deform. Then the stopper releases the rack allowing the leg to move within the groove. When the external force is removed, the elastic part recovers from the deformation. Then the stopper engages with the rack again to constrain the leg.

This and other aspects of the present invention will become clean to those of ordinary skill in the art after having read the following detailed description of the preferred embodiment which is illustrated in the various figures and drawings.

BRIEF DESCRIPTION OF THE DRAWINGS

FIG. 2b shows a profile of the embodiment of FIG. 2a;

FIG. 4b shows a profile of the embodiment of FIG. 4a;

DETAILED DESCRIPTION

Figure 1:
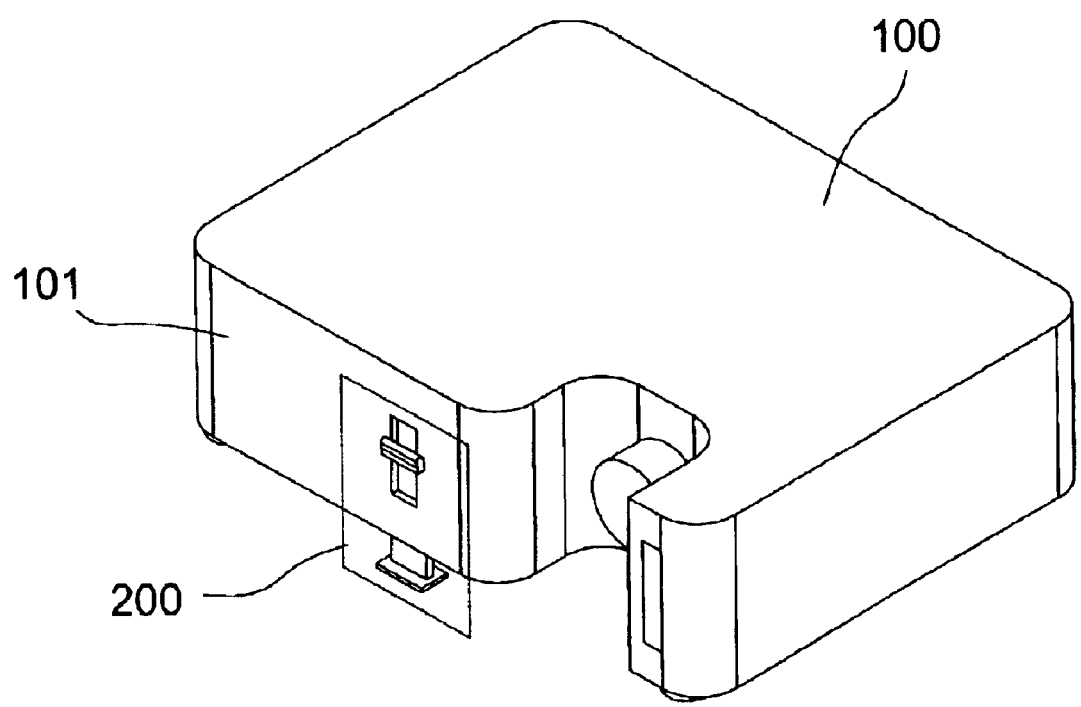
FIG. 1 shows a first embodiment of the present invention.

The present invention provides an electronic apparatus including an adjusting apparatus for changing the height of the electronic apparatus. FIG. 1 shows a first embodiment of the present invention. As FIG. 1 shows, the adjusting apparatus 200 connects with the electronic apparatus 100. Particularly, the electronic apparatus 100 has a housing 101, and the adjusting apparatus 200 connects with a surface of the housing 101. The electronic apparatus 100 mentioned above may include a projector, a slide projector, and other similar apparatuses.

Figure 2A:
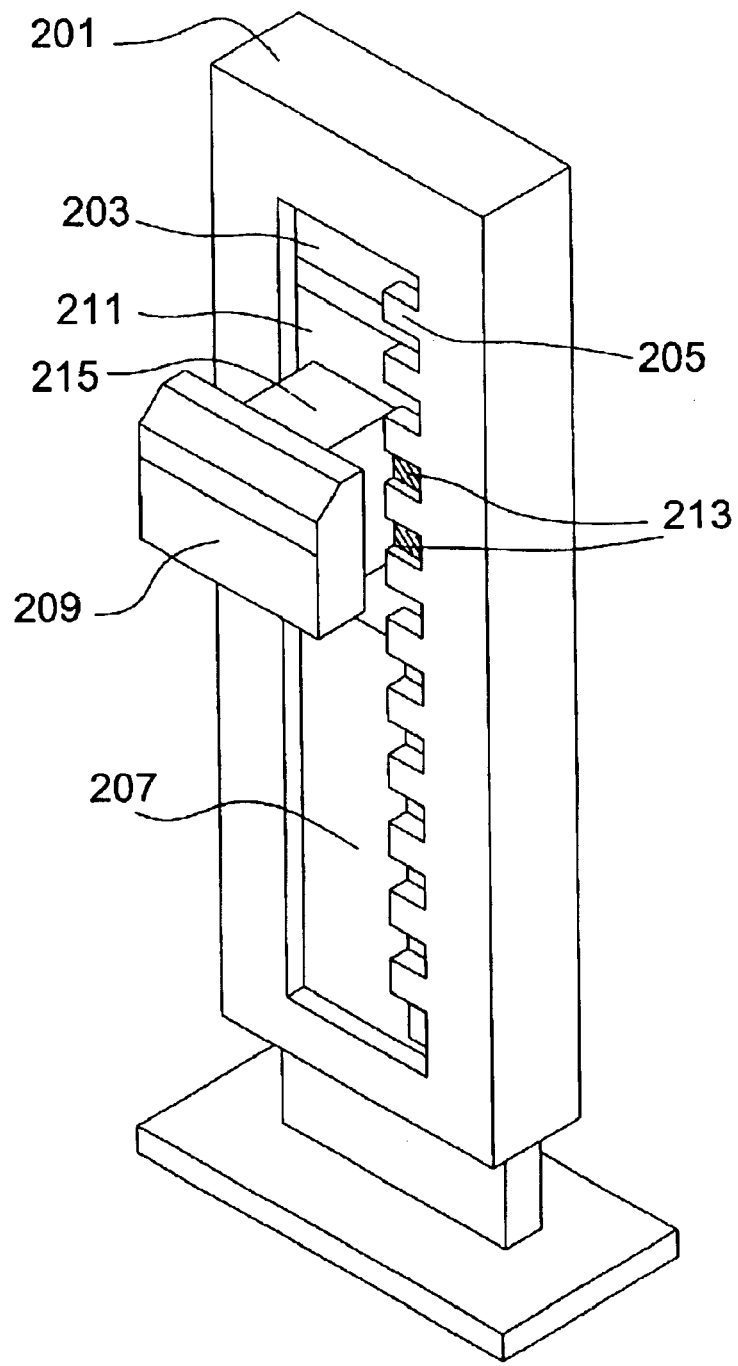
FIG. 2a shows an adjusting apparatus of the embodiment of FIG. 1.

FIG. 2a shows an embodiment of the adjusting apparatus 200. The adjusting apparatus 200 includes a connecting part 201, a leg 207, a push button 209, a extending part 215, an elastic part 211, and a stopper 213. The connecting part 201 connects with the housing 101 and includes a groove 203 and a rack 205. The leg 207 is movably disposed within the groove 203 for selectively supporting the electronic apparatus 100. The elastic part 211 connects with the leg 207. The stopper 213 selectively engages with the rack 205 to constrain the leg. The push button 209 connects with the elastic part 211 by using the extending part 215.

Figure 2B:
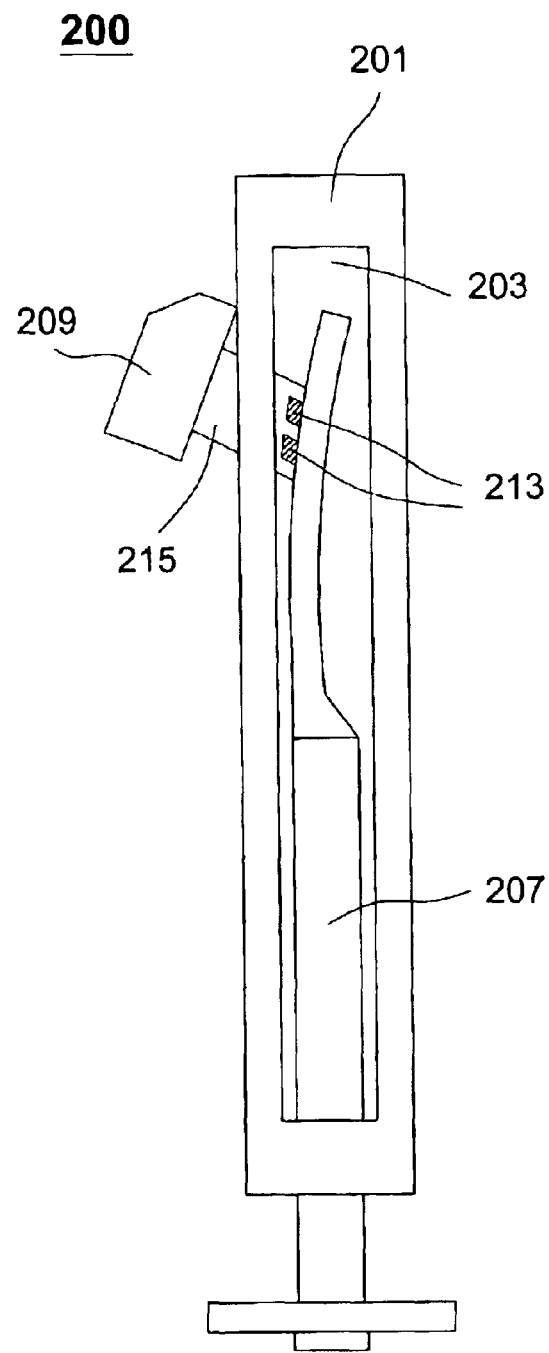

FIG. 2b shows a profile of the embodiment of FIG. 2a. An external force is exerted on the push button 209 to force the push button 209 to push the elastic part 211 to deform. Then the stopper 213 releases the rack 205 allowing the leg 207 to move within the groove 203.

When the external force is removed, the elastic part 211 recovers from the deformation. Then the stopper 213 engages with the rack again to constrain the leg 207.

Generally, the position of the connection between the adjusting apparatus 200 and housing 101 may be changed depending on users' demands. As the embodiment shown in FIG. 1, the adjusting apparatus 200 is disposed on a front part of the housing 101. In addition, the push button 209 is exposed to an outside of the housing 101 to make the users easy to operate.

Figure 3:
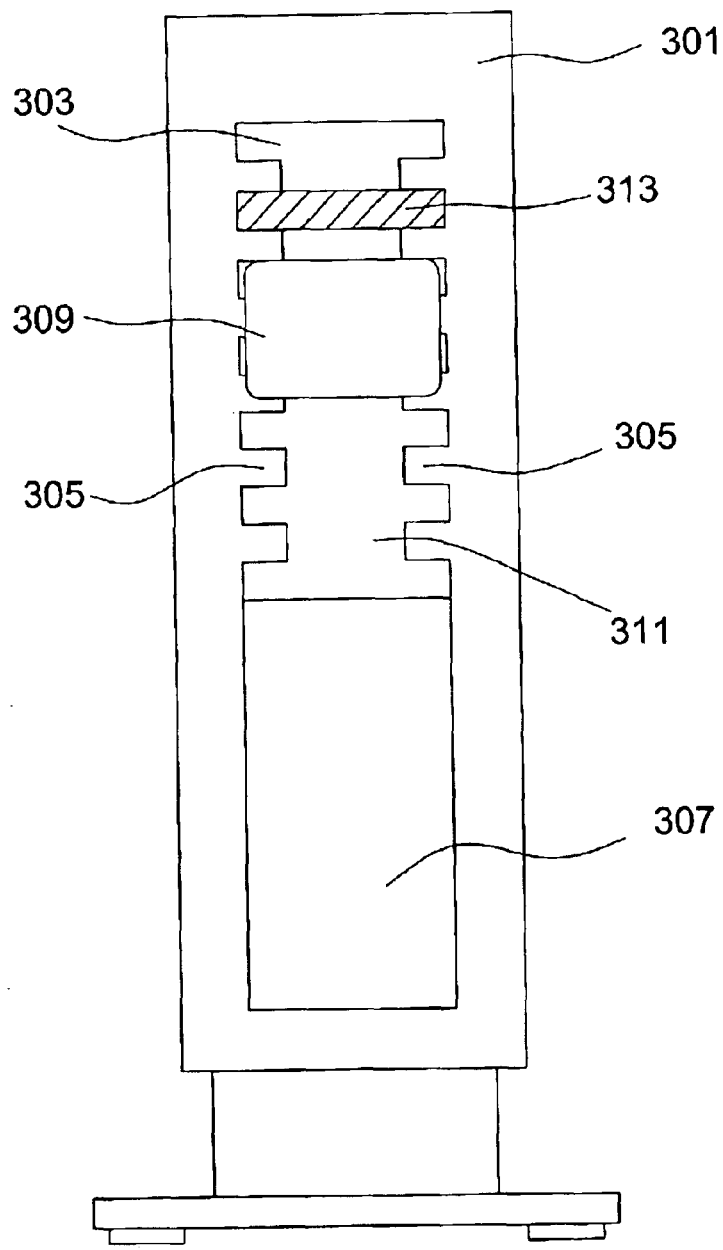
FIG. 3 shows a front view of the adjusting apparatus of a second embodiment.

FIG. 3 shows a second embodiment of the adjusting apparatus 300. The adjusting apparatus 300 includes a connecting part 301, a groove 303, a rack 305, a leg 307, a push button 309, an extending part 315, an elastic part 311 and a stopper 313. What is the difference between the first and second embodiments is, the rack 305 of the second embodiment is a two-sided rack. Therefore, the stopper 313 has to be re-designed to adapt to the two-sided rack.

Figure 4A:
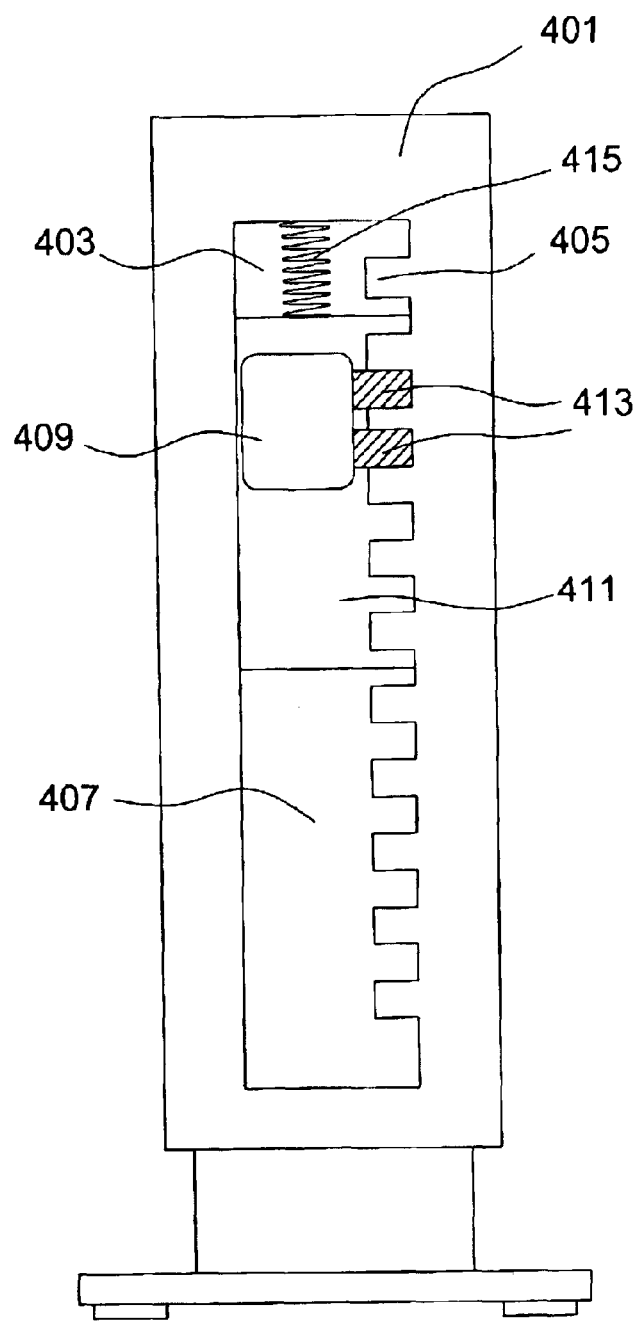
FIG. 4a shows a front view of the adjusting apparatus of a third embodiment.
Figure 4B:
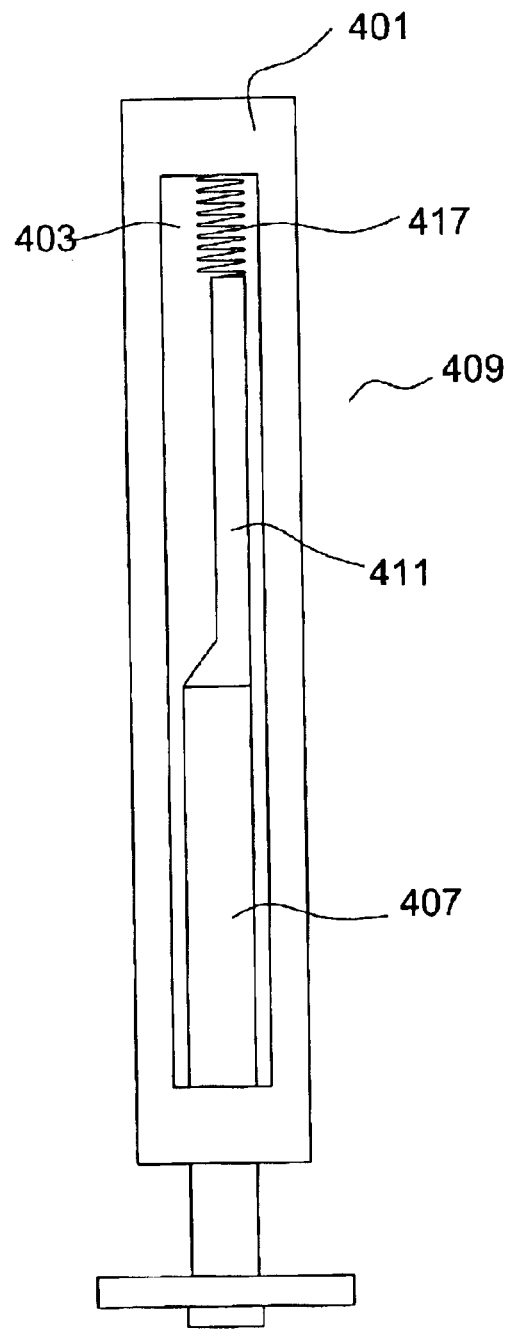
Figure 5:
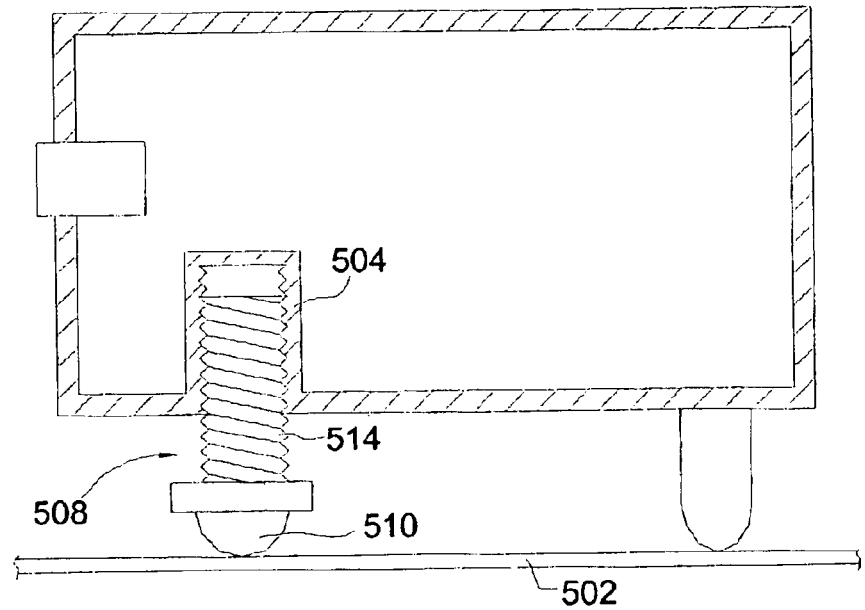
FIG. 5 shows a traditional adjusting embodiment.
Figure 6:
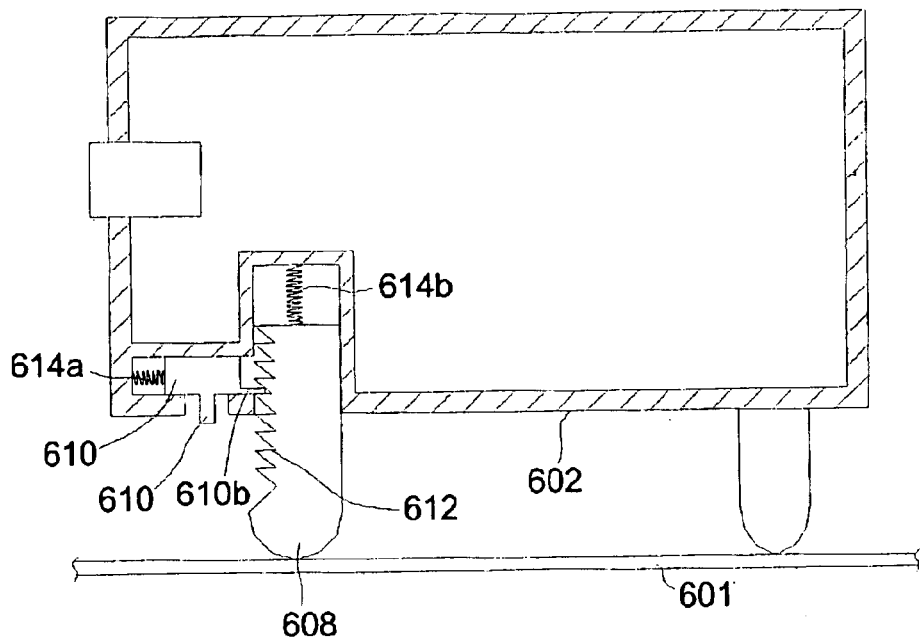
FIG. 6 shows another traditional adjusting embodiment.

FIG. 4a shows a third embodiment of the adjusting apparatus 400. The adjusting apparatus 400 includes a connecting part 401, a groove 403, a rack 405, a leg 407, a push button 409, an elastic part 411, a stopper 413 and an elastic element 417. The difference between the third embodiment and above embodiments is that the push button 409 directly connects with the elastic part 411. Therefore, the push button 409 has a smaller width than the push buttons 209 and 309 do, so it is capable to be pressed in the housing 101. In addition, the elastic element 417 provides the leg 407 with an elastic force to recover the position of the leg 407.

Those skilled in the art will readily observe that numerous modifications and alterations of the device may be made within the teaching of the invention. Accordingly, the above disclosure should be construed as limited only by the metes and bounds of the appended claims.

What is claimed is:

1. An electronic apparatus including a housing, said housing including an opening, said electronic apparatus comprising:

a connecting part connecting with said housing, said connecting part including a groove and a rack, said groove corresponding to said opening;

a leg movably disposed within said groove for selectively supporting said electronic apparatus;

an elastic part connecting with said leg, said elastic part providing a force to facilitate said leg being movably disposed within said groove;

a push button connecting with said elastic part and being exposed to an outside of said housing for driving said leg to move along said groove and the push button including an extending part connected with said elastic part; and a stopper connecting with said elastic part for selectively engaging with said rack to constrain a position of said leg;

wherein said elastic part includes a surface, and said stopper and said extending part are connected with said surface respectively, and when said push button is not pressed, said stopper engages with said rack, and when said push button is pressed, said stopper departs from said rack.

2. An electronic apparatus including a housing, said housing including an opening, said electronic apparatus comprising:

a connecting part connecting with said housing, said connecting part including a groove and a rack, said groove corresponding to said opening;

a leg movably disposed within said groove for selectively supporting said electronic apparatus;

an elastic part connecting with said leg, said elastic part providing a force to facilitate said leg being movably disposed within said groove;

a push button connecting with said elastic part and being exposed to an outside of said housing for driving said leg to move along said groove and the push button including an extending part connected with said elastic part; and a stopper connecting with said elastic part for selectively engaging with said rack to constrain a position of said leg;

wherein said elastic part includes a surface, and said stopper and said extending part are connected with said surface respectively, and when said push button is not pressed, said stopper engages with said rack, and when said push button is pressed, said stopper departs from said rack and said push button is vertically movable in said opening.

* * * * *